H. F. BELKNAP.
DRAFT PIPE CAP.
APPLICATION FILED OCT. 20, 1913.
1,103,734.
Patented July 14, 1914.
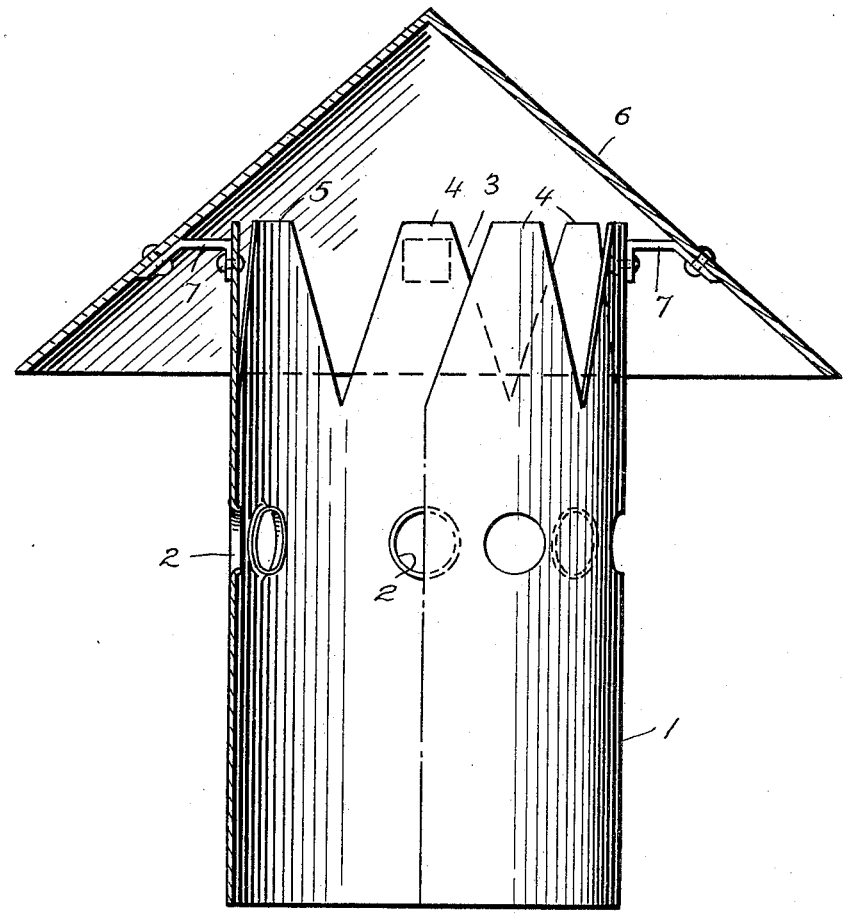
Witnesses
R N Jones
Inventor
H. F. Belknap.
By
Attorney

UNITED STATES PATENT OFFICE.

HERBERT F. BELKNAP, OF MARSHFIELD, MASSACHUSETTS.

DRAFT-PIPE CAP.

1,103,734. Specification of Letters Patent. Patented July 14, 1914.

Application filed October 20, 1913. Serial No. 796,302.

*To all whom it may concern:*

Be it known that I, HERBERT F. BELKNAP, a citizen of the United States, residing at Marshfield, in the county of Plymouth and State of Massachusetts, have invented certain new and useful Improvements in Draft-Pipe Caps; and I do hereby declare the following to be a full, clear, and exact description of the invention, such as will enable others skilled in the art to which it appertains to make and use the same.

This invention relates to draft pipe caps designed for the purpose of increasing or creating an artificial draft for the upper end of ventilating pipes, smoke pipes or other pipes or connections leading into the open air.

One of the principal objects of the invention is to provide a pipe connection designed to be placed upon the upper end of a ventilating or other pipe which will be provided with a series of annular perforations extending around the pipe and a series of V-shaped apertures cut from the upper ends of the pipe to coact in giving an increased draft outlet at the upper end of the pipe.

With the objects referred to in view my invention consists of a pipe or cap which is shown in the accompanying drawing in elevation and partial section, with the crown member indicated in dotted lines.

Referring to the drawing the numeral 1 designates the draft pipe which may be of any suitable length and diameter to conform to the size of the pipe to which it is to be attached. A series of comparatively large ventilating holes 2 are formed closely together and extend entirely around the pipe. At points intermediate the perforations 2, in the upper edge of the pipe 1 are formed an annular series of V-shaped notches or recesses 3. Intermediate the notches are projections 4, and these projections have angular upper ends 5.

A suitable cap or cowl 6 may be secured to the upper end of the pipe when required, said cowl or cap being connected to the projections 4 by means of suitable brackets 7.

From the foregoing it will be obvious that the heated air or odors coming up through the pipe 1 will be carried out through the apertures 3 by the ingress of air through the perforations 2, and that a constant draft will be created. The perforations 3 being located entirely around the pipe 1 will receive the air blowing from any direction and owing to the heated air or odors coming up through the pipe will be immediately carried out through the perforations or recesses 3, thus acting as a suction draft to carry the hot air out through the recesses into the open air and drawing in sufficient fresh air below to take the place of the vitiated air or odors passing out of the pipe through the recesses 3.

My invention is simple in construction, can be manufactured at low cost and is very efficient for its purpose.

What is claimed is:—

The herein described draft pipe comprising a short length of pipe having a series of perforations spaced apart and extending around the pipe, a series of projections at the upper end of the pipe in vertical alinement with said perforations, said pipe being provided with a series of V-shaped recesses extending entirely around the pipe intermediate the perforations and projections, a conical cap connected to the upper end of the pipe, and supporting brackets for said cap connected to said projections and to said cap.

In testimony whereof I affix my signature in presence of two witnesses.

HERBERT F. BELKNAP.

Witnesses:
EMMA L. DELANO,
ELDON H. BAILEY.

Copies of this patent may be obtained for five cents each, by addressing the "Commissioner of Patents, Washington, D. C."